United States Patent [19]

Okumura et al.

[11] Patent Number: 4,626,304

[45] Date of Patent: Dec. 2, 1986

[54] METHOD OF MAKING A LIGHT-POLARIZING PLATE

[75] Inventors: Takuzo Okumura, Osaka; Masataka Yanase, Tokyo; Hitoshi Kikui, Osaka, all of Japan

[73] Assignee: Sumitomo Chemical Company, Limited, Osaka, Japan

[21] Appl. No.: 776,834

[22] Filed: Sep. 17, 1985

Related U.S. Application Data

[62] Division of Ser. No. 584,908, Feb. 29, 1984, Pat. No. 4,564,545.

[30] Foreign Application Priority Data

Mar. 1, 1983 [JP] Japan .............................. 58-034236

[51] Int. Cl.$^4$ ............................................. B32B 31/12
[52] U.S. Cl. ................................... 156/163; 156/229; 427/163; 428/422; 428/475.8; 428/910; 428/913
[58] Field of Search ......................... 156/60, 163, 229; 427/162, 163; 428/34, 76, 422, 475.8, 910, 913

[56] References Cited

U.S. PATENT DOCUMENTS 3,075,857  1/1963  Fior et al. ...................... 156/334 X
3,244,582  4/1966  Kuhl ................................... 428/77

*Primary Examiner*—Robert A. Dawson
*Attorney, Agent, or Firm*—Cushman, Darby & Cushman

[57] ABSTRACT

A light-polarizing plate for display use is improved in its humid, thermal and weather durabilities by controlling moisture content of a light-polarizing film made of polyvinylalcohol prior to be laminated with protector film and also by using as protector film a hydrophobic polymer film having low water vapor transmission.

6 Claims, No Drawings

METHOD OF MAKING A LIGHT-POLARIZING PLATE

This is a division of application Ser. No. 584,908 filed Feb. 29, 1984 and now U.S. Pat. No. 4,564,545.

General Statement of the Invention

This invention relates to a light-polarizing plate having excellent durability and production of the same.

Hitherto, light-polarizing plate has been generally produced by the process, in which a stretch-oriented base film was dyed with iodine or dichroism dye to develop acceptable polarizing capability, thereby a light-polarizing film was prepared and thereafter the film was provided with protector films on both surfaces thereof. There has been mainly used as base film above polyvinylalcohol or its derivative film, and as protector film above, a film made of cellulose acetate or acrylic resin in the state of substantial non-orientation, and provision of protector films has been effected by lamination thereof or coating of the solution containing the protector material. Light polarizing plates thus produced are now applied to such uses as in display by liquid crystal, removal of reflected-light, or decoration materials. Actually light-polarizing plates made by iodine-treated polyvinylalcohol (hereinafter, abbreviated as PVA) are commercially employed for its acceptable performance.

Then, as important requirement for a light-polarizing plate, there are recognized the polarizability which is represented by the degree of light-polarization and, more seriously, the capability of maintaining the initial polarizability in a long-term use. The latter is commonly called the durability. Hitherto, there have been presented a number of requests for improving the durability of conventional polarizing plates in different use conditions, and, among desires hitherto, the humid durability performed by a conventional polarizing plate comprising PVA base film is specially unsatisfactory, hence the enhancement thereof has been strongly requested. Accordingly, for the purpose of improving the humid durability thereof, there are put forward several propositions, for instance, PVA is incorporated a dehydrating catalyst and heated to create polyene bonds or PVA film is dyed on one-side surface thereof in the dying process on the way to prepare a polarizing film or the substitution of PVA to same other sort of material, such as, saponified EVA. For all propositions, satisfactory results are not yet achieved thereon. "EVA" is ethylene-vinyl acetate copolymer.

These problems with conventional polarizing films have been studied by the inventors of this invention and it is now found that the moisture content in a polarizing film at the process stage prior to undergo lamination with protector films has been ignored of its importance, since cellulose acetate or acrylic film used as protector has such a high rate of moisture transmission that moisture content in hydrophilic polarizing film has been thought to exert little or no effect on the durability of the laminated plate. Then it is now proved that the humid and thermal resistances of polarizing plates are unexpectedly enhanced by taking means of covering a hydrophilic polarizing film in the state of low moisture content with protector films made of highpolymer having low water vapor transmission, thereby this invention is attained.

Referring to features of this invention, this invention is firstly featured in that, in producing a light-polarizing plate comprising a hydrophilic polarizing film covered, in the manner of coating or laminating or wrapping like an envelope, by highpolymer films consisting of one or more layers having not less than 30% of the average light transmission in the visible region, said high polymer protector film is required to have the water vapor transmission of not more than 10 g/m$^2$.day.

A light-polarizing film often abbreviated as just "polarizing film" hereinafter, which is allowed to use in this invention, is not limited to PVA based film, but a film capable of absorbing even a little moisture is included in this invention.

The second feature of this invention lies in that, the initial moisture content required to the polarizing film of this invention should be not more than 5%, desirably not more than 2%. The less moisture content thereof is obtained, the more enhancement in the durability will be attained in this invention as will be explained hereinafter.

The water vapor transmission of a highpolymer protector film should be not more than 10 g/m$^2$.day, desirably not more than 5 g/m$^2$.day, when measured according to the method provided in Japanese Industrial Standards (JIS)-Z0208, equivalent to American Society for Testing and Material ASTM-E96 under 40°C.–90% Relative Humidity(RH). More desirably, choice of a high polymer having a water vapor transmission value within the limit described above in its thickness range within 100μis preferred for the merit of less weighing and thinning of the plate, further for another merit of providing high light transmission in the state of single film.

Referring specifically to the protector film, suitable examples are: fluorocarbon resins, e.g. tetrafluoroethylene-hexafluoropropylene copolymer; polyolefin resins, e.g. high density polyethylene, polypropylene; polyamide resins, e.g. 12-nylon, 66-nylon. Particularly preferred is a uniaxially stretched film thereof, for the effect of improved light-transmission and lowered water vapor transmission which is produced by processing cast film molded from high polymer resin as described above.

The uniaxial stretch of high polymer film may be effected by inter-roll stretch with tensile force, or by inter-roll stretch under roll pressure and the like. And the roll pressure process for the uniaxial stretch is advantageous because of providing a stretched film with excellent light-transmission, also because of being applicable to a broad range of high polymers and their composites with high yield.

For instance of a high polymer which is provided with the high light transmission and low water vapor transmission by means of the rolling process, high density polyethylene, polypropylene may be cited. These instance polymers are preferred in terms of low cost and less weight, but not preferred as far as they remain unstretched for the reason of their low light transmission.

Further, secondary processing, e.g. heat treatment of rolled films for the purpose of improving the film flatness may be adopted, if desired.

In the event that a protector film is composed of two or more layers, the stretch process as described above may be applied to optional one layer, or to optional two or more layers.

In the application of a high polymer film uniaxially stretched by rolling, it is preferred, in order to provide a polarizing film with higher light polarizing co-efficient and higher light transmission of single polarizer, that a protector film be set so that the direction of stretch-orientation thereof may be coincident with the same of a polarizing film.

The stretch process as described above may enable, in addition to high polymers cited above, such a number of other high polymers to be serviceable to this invention as polyester resins, polyvinylchloride resins which are unsuited to this invention if otherwise unstretched.

As a procedure for providing a protector film on the surface of a polarizing film there can be employed laminating of a high polymer film as defined above using an adhesive, or a high polymer can be tightly adhered on a polarizing film's surface so that the polarizing film may be sealed off completely, or a high polymer film as defined in this invention can be produced by coating, or there can be provided a preliminary protector layer which does not have satisfactory durability and subsequently there is provided a preferred high polymer film as defined in this invention on top of the preliminary protective layer using any of the procedures described above. In any event the suitable means may be chosen on a case by case basis.

Further, high polymer films defined in this invention may be composed of two layers or more, and may be incorporated dyes, additives or the like.

Enhancement of Humid Durability

The polarizability in this invention is defined by the following formula. Specifically, two sample sheets of polarizing films or plates are made ready and piled one above the other and subjected to measurement of a light transmission curve.

The spectrophotometer UV-210 by Shimadzu Seisakusho was used.

The polarizability value is given by $$\text{Polarizing co-efficient} = \sqrt{\frac{H_{\parallel} - H_{\perp}}{H_{\parallel} + H_{\perp}}} \times 100 \; (\%)$$

wherein $H_{\parallel}$ denotes the parallel transmission which is measured when two sample sheets are piled so that the directions of stretch-orientation thereof may be in parallel each other, and $H_{\perp}$ denotes the cross transmission which is measured when two sample sheets are piled so that the directions of stretch-orientation thereof may be cross each other. The data of polarizabilities given in examples, reference examples and comparative examples hereinafter are prepared in such a method that, in the first place, an average value is derived from measurements at every 10 nm interval in the whole range of 400 nm–700 nm, then, where a film was dyed with iodine or where a commercial sample was used, the average value of 400 nm to 700 nm is described, and the best value measured in the whole range is described with indication of wave length where a dye other than iodine was used.

REFERENCE EXAMPLE 1

PVA film (Kurare Vinylon ® 7500) of 75 microns was stretched 4 times uniaxially in the longitudinal direction, thereby the polarizing base film was prepared. And this 4 times stretched film was dipped with being kept in tension for about 60 seconds at 20° C. in the solution which was composed of 10 g of iodine, 150 g of potassium iodide and 3300 g of water. Then it was again dipped for about 30 seconds at 50° C. in the solution which was composed of 100 g of boric acid and 2000 g of water. Thereafter it was washed much with alcohol, thereby obtained was the polarizing film of 5 cm square. On the other hand, a three-side sealed sack like a letter envelope was prepared by folding a high density polyethylene (hereinafter, abbreviated HDPE) film of 100 microns which was uniaxially stretched 7 times in the longitudinal direction. Then it should be noted that the means of stretching HDPE film above was made by rolling where the temperature of rolls were at 90° C. and water was used as lubricant. And the stretched film had the thickness of 100 microns and the water vapor transmission of 0.6 g/m$^2$.day.100 microns and the average light transmission of 80% in the visible region.

The polarizing film made of PVA and iodine treatment was put at its moisture content of 9% into the HDPE sack folded and sealed like a letter envelope, of which the remaining open side was then sealed. Thus obtained was the polarizing plate consisting of the polarizing film wrapped completely by the HDPE sack as protector where, the stretch orientations of both the polarizing film and the protector sack were set in the same direction at sealing. The polarizing plate above was stored in the constant temperature-humidity conditioner under 40° C.–90% RH for 96 hrs. Thereafter the decrease extent from the initial value was measured of the polarizability thereof. Data on the initial and post-humidity test are shown in Table 1.

REFERENCE EXAMPLE 2

The polarizing film based on PVA-iodine treatment was prepared under the same conditions as in Reference Example 1. The HDPE film of 100 microns, which had been stretched 7 times in the same way as Reference Example 1, was laminated on both surfaces of the polarizing film above at its moisture content of 9%. In laminating thereof, urethane adhesive was used and the stretch-orientations of the polarizing film and the protector film were set in the same direction.

The polarizing plate thus obtained was stored for 96 hrs. under 40° C.–90% RH in the constant temperature-humidity conditioner. Thereafter the polarizability thereof was measured to check the decrease extent from the initial. Data on the initial and post-test are shown in Table 1.

REFERENCE EXAMPLE 3

A commercial polarizing plate was used which was manufactured by Sanritsu Electric Co., Ltd. with the brandname Barilite ® LLC$_2$-12-18. It contains moisture of more than 5%. It consists of the PVA based polarizing film laminated on both surfaces thereof with the cellulose acetate film containing a ultraviolet absorber as protector film. In the first place, the initial polarizability thereof was measured. On the other hand, a three side sealed sack like a letter envelope was prepared with HDPE film of 100 microns which had been stretched 7 times under the same with condition as in Reference Example 1. The commercial polarizing plate above was put into the HDPE sack above and the remaining open side thereof was then sealed. Thereby, a polarizing plate was prepared where the polarizing plate consisting of the polarizing film and the triacetate protector was completely wrapped by a sealing envelope made of the roll stretched HDPE protector film. The polarizing plate thus obtained was stored under 40° C.–90% RH in the constant temperature-humidity conditioner for 96 hrs. Thereafter the commercial polarizing plate was put out of the HDPE envelope and the polarizability thereof was measured. Table 1 shows results obtained.

REFERENCE EXAMPLE 4

The commercial polarizing plate was used which was manufactured by Nitto Denki Kogyo Co., Ltd. with the brandname NPF-1100H. It contains moisture of more than 5%. It used acrylic resin as protector. The test procedures in the following were conducted after adhesive on the one surface thereof was removed. In the first place, the initial polarizability thereof was measured. On the other hand, a three side sealed sack like a letter envelope was prepared with HDPE film of 100 microns which had been stretched 7 times under the same condition as in Reference Example 1, and the commercial polarizing plate above was put into the HDPE sack above and the remaining open side thereof was then sealed. Thereby, a polarizing plate was made ready where the polarizing plate consisting of the polarizing film and the acrylic resin protector was completely wrapped by the sealing envelope made of roll-stretched HDPE protector film. The polarizing plate thus obtained was stored under 70° C.–90% RH in the constant temperature-humidity conditioner for 60 hrs. Thereafter the commercial polarizing plate was put out of the HDPE envelope and the polarizability thereof was measured. Table 1 shows results obtained.

REFERENCE EXAMPLE 5

The PVA polarizing base film was prepared under the same condition as in Reference Example 1 and was stretched 4 times. This 4 times stretched PVA film was dipped with being kept under tension in a dichroism dying bath at 50° C. for 40 min., thereby a yellow colored polarizing film was prepared. The dying bath above was composed of 1900 g of water, 0.7 g of anhydrous sodium sulfate and 0.05 g of Chrysophenine, a product by Sumitomo Chemical Co., Ltd. On the other hand, a three side sealed sack like a letter envelope was prepared with HDPE film of 100 microns which had been stretched 7 times under the same condition as in Reference Example 1, and above said colored polarizing film of moisture content 5% was put into the HDPE sack above and the remaining open side thereof was sealed. Thereby, prepared was the polarizing plate where the polarizing film was wrapped with the protector sack and where stretch-orientations of both the polarizing film and protector were set in the same direction. The polarizing plate thus obtained was stored under 70° C.–90% RH in the constant temperature-humidity conditioner for 60 hrs. Table 1 shows data of the initial and the post-test measurements at the wave length 410 nm.

COMPARATIVE EXAMPLE 1

The polarizing film based on PVA-iodine treatment was prepared under the same condition as in Reference Example 1. On the other hand, the same sack as hereinbefore was prepared by using a commercial PMMA film, made by Nippon Carbide Industries Co., Ltd., HIS ® -A film, in the same way as in Reference Example 1. This PMMA film had the thickness of 50 microns and the water vapor transmission of 140 g/m$^2$. day.100 microns and the light transmission of 87%. The above said PVA-iodine treatment polarizing film containing moisture of 9% was put into the PMMA film sack and then the remaining open side was sealed. Thereby prepared was the polarizing plate completely wrapped by the protector film of PMMA. The polarizing plate thus obtained was stored under 40° C. –90% RH in the same conditioner as hereinbefore for 96 hrs. Thereafter the post-test polarizability was measured, by which the decrease extent from the initial was determined. Results are shown in Table 1.

COMPARATIVE EXAMPLE 2

A commercial polarizing plate, by Sanritsu Electric Co., Ltd., Barilite ® LLC-$_2$ 12-18, itself as it was, was subjected to the test where the plate was stored under 40° C.–90% RH in the same conditioner as hereinbefore for 96 hrs. Thereafter the post-test polarizability thereof was measured. Results are shown in Table 1.

COMPARATIVE EXAMPLE 3

A commercial polarizing plate, by Nitto Denki Kogyo Co., Ltd., NPF-1100H, itself as it was, was subjected, excepting that adhesive on one-side surface was removed, to the test where the plate was stored under 70° C.–90% RH in the same conditioner for 60 hrs. Thereafter the post-test polarizability was measured. Results are shown in Table 1.

COMPARATIVE EXAMPLE 4

A colored polarizing film based on PVA-dichroism dye was prepared under the same condition as in Reference Example 5. On the other hand, the same sack hereinbefore was prepared with the same PMMA film as used in Comparative Example 1. Above said colored polarizing film containing moisture 5% was put into the PMMA film sack and the remaining open one side was sealed. Thereby, prepared was the polarizing plate completely wrapped by the protector film of PMMA. The polarizing plate thus obtained was stored under 70° C.–90% RH in the same conditioner for 60 hrs. The initial and post-test polarizabilities at the wave length 410 nm are shown in Table 1.

TABLE 1

|  | Initial Performance | | Post-Humid Test Performance | |
| --- | --- | --- | --- | --- |
|  | Transmission of Single Polarizer (%) | Polarizing Co-Efficient (%) | Transmission of Single Polarizer (%) | Polarizing Co-Efficient (%) |
| Reference Example | | | | |
| 1 | 36 | 95 | 36 | 95 |
| 2 | 37 | 96 | 36 | 95 |
| 3 | 33 | 91 | 47 | 92 |
| 4 | 45 | 93 | 49 | 85 |
| 5 | 47 | 58 | 46 | 60 |
| Comparative | | | | |

TABLE 1-continued

|  | Initial Performance | | Post-Humid Test Performance | |
| --- | --- | --- | --- | --- |
|  | Transmission of Single Polarizer (%) | Polarizing Co-Efficient (%) | Transmission of Single Polarizer (%) | Polarizing Co-Efficient (%) |
| Example | | | | |
| 1 | 37 | 97 | above 70 | below 30 |
| 2 | 33 | 91 | 53 | 83 |
| 3 | 45 | 93 | 62 | 52 |
| 4 | 47 | 58 | above 70 | below 30 |

Enhancement of Humid and Thermal Durabilities

Shown in the foregoing Reference Examples 1-5 and Comparative Examples 1-4 are test results on the polarizing plates in which high polymer films defined in this invention are employed as protector and, for comparison, on conventional polarizing plates by means of the intensified humid test. Thereby the advantage of this invention under humid atmosphere is proved.

However, the polarizing plates having humid durability as described hereinbefore are not always satisfactory in terms of thermal durability. Hence potential applications thereof will be limited although they exceed conventional plates.

Therefore the enhancement of humid and thermal durabilities has been studied by present inventors and is attained to be satisfactory level.

The new process for producing the enhancement above is featured in that, in preparing a light-polarizing plate comprising a hydrophilic polarizing film which is covered, in the manner of coating or laminating or wrapping like an envelope, by high polymer films consisting of one or more layers having not less than 30% of the average light transmission in the visible resion, the polarizing film should be conditioned to have a moisture content of not more than 5%, desirably not more than 2% when it is to be provided with a protector film on both surfaces of the polarizing film. Thereby, it is found that a polarizing plate having excellent humid and thermal durabilities is obtained.

Referring specifically to the new process proposed herein in which the high polymer film is provided on both surfaces of a polarizing film, not only is a polarizing film sandwiched between high polymer films as defined in this invention, but also the high polymer layers applied by coating or laminating are both required to undergo moisture control, the framed and thermal characteristics of such control, improve further weather characteristics. The control of the moisture content of a polarizing film can be accomplished by drying during the process of producing a finished plate.

EXAMPLE 1

A polarizing film made of PVA and iodinetreatment was prepared under the same condition as in Reference Example 1, and the film was dried in a constant temperature box, at 100° C. for 1 hr, to have the decreased moisture content of 1%. On the other hand, a three side sealed sack like a letter envelope was prepared with HDPE film of 100 microns which had been stretched 7 times under the same condition as Reference Example 1. The moisture content of this HDPE film was less than 0.1%. Then above said polarizing film having moisture content 1% was put into said HDPE sack like a letter envelope and thereafter the remaining open side was sealed. Thus prepared was the polarizing plate wrapped completely with a protector film. This polarizing plate was stored under 70° C.-90% RH in a constant temperature-humidity conditioner for 96 hrs, thereby the humid durability was tested. Then one group of polarizing plates out of two groups thereof was subjected to the thermal resistance test by storing in the constant temperature box for 13 hrs, further another group was stored in the sunshine weather meter for 200 hrs, thereby the weather resistance was tested. Results are shown in Table 2.

EXAMPLE 2

A commercial polarizing plate made by Sanritsu Electric Co., Ltd. with the brandname Barilite® LLC$_2$-12-18 was dried in the same box as hereinbefore at 100° C. for 1 hr. The weight loss across the drying was 4.0%. It contains moisture of about 1%. On the other hand, a HDPE film of 100 microns which had been stretched 7 times under the same condition as Reference Example 1 was folded and sealed at three sides to be a sack like a letter envelope. Above said commercial polarizing plate was put into the HDPE sack and then the remaining open side was sealed. It should be noted that putting into and sealing above were conducted quickly just after the polarizing plate was taken out of the box above. The polarizing plate thus obtained was stored under 70° C.-90% RH in the same conditioner as hereinbefore for 96 hrs. Another polarizing plate obtained in the same way was stored in the same box as hereinbefore at 100° C. for 13 hrs. After these tests were finished, the commercial plate was taken out of the protector HDPE sack and was measured of its performances. Results are shown in Table 2.

EXAMPLE 3

The commercial polarizing plate, made by Nitto Denki Kogyo Co., Ltd. with the brandname NPF-1100H, which was used in tests after adhesive on oneside thereof was removed. In the first place, the polarizing plate was dried in the same box at 100° C. for 1 hr. The weight loss across the drying was 2.5%. It contains moisture of about 1%. On the other hand, a HDPE film of 100 microns which had been stretched 7 times under the same condition as in Reference Example 1 was folded and sealed at three sides to be a sack like a letter envelope. Above said commercial polarizing plate was put into the HDPE sack and then the remaining open side was sealed. These putting into and sealing above said were conducted quickly just after the polarizing plate was taken out of the box. The polarizing plate thus obtained was stored under 70° C.-90% RH in the same conditioner for 96 hrs. Another polarizing plate obtained in the same way was stored in the same box at 100° C. for 13 hrs. After these tests were finished, the commercial plate was taken out of the protector HDPE sack and was measured of its performance. Results are shown in Table 2.

EXAMPLE 4

A PVA polarizing base film was prepared under the same condition as in Reference Example 1. This PVA film was stretched 4 times and dipped with being kept in tension at 15° C. for 40 seconds into the same aqueous solution composed of iodine and potassium iodide as in Reference Example 1, and again dipped at 50° C. for 90 seconds into the boric acid aqueous solution with the same composition as in Reference Example 1, and further was washed much with alcohol at 15° C., thereby the polarizing film was obtained. This film had the moisture content of 11%. Films prepared in the same way above were dried and films having moisture content at 8%, 5% and 1% were made ready.

On the other hand, HDPE film of 80 microns which had been stretched 6 times by rolling under the same condition as in Reference Example 1 was folded and sealed to the same sack as hereinbefore. Into HDPE sacks above, iodine-treated PVA polarizing films having the moisture content 11%, 8%, 5% and 1% were each put and sealed respectively in the same way. Polarizing plates thus obtained were stored in the same box at 100° C. for 15 hrs. Thereafter the sealed polarizing films were taken out of HDPE sacks and were measured of their performances. In Table 3, data are shown with initial performances at the time of being dyed. On the other hand, another group of the sealed plates prepared in the same way was stored under 70° C.–90% RH in the same conditioner, thereby the humid durability was tested. Results are shown in Table 3

COMPARATIVE EXAMPLE 5

The experiment was conducted with the same procedures as in Example 1, where only difference therefrom lay in that the iodine-treated PVA polarizing film was put and sealed into the HDPE sack as the polarizing film had moisture content of 10%. Results are shown in Table 2.

COMPARATIVE EXAMPLE 6

The experiment was conducted with the same procedures as in Example 2 where only difference therefrom lay in that the commercial polarizing plate was, in the state of undried as stored in dark area for longterm stock, sealed in the HDPE sack. Results are shown in Table 2.

COMPARATIVE EXAMPLE 7

The experiment was conducted with the same procedures as in Example 3 where only difference lay in that the commercial polarizing film was sealed undried into the HDPE sack. Results are shown in Table 2.

COMPARATIVE EXAMPLE 8

A polarizing film was prepared in the same way as in Example 4 and both surfaces thereof were laminated with commercial cellulose triacetate film of 80 microns by Fuji Film Co., Ltd. as protector so that polarizing plates having different moisture contents may be available. Then these polarizing plates were tested of humid durability under the same condition as Example 4. Table 3 shows the initial and the post-humid test performances.

TABLE 2

| | Thermal Durability Test | | | | Humid Durability Test | | | | Weather Durability Test | | | |
|---|---|---|---|---|---|---|---|---|---|---|---|---|
| | Initial Performance (%) | | Post-test Performance (%) | | Initial Performance (%) | | Post-test Performance (%) | | Initial Performance (%) | | Post-test Performance (%) | |
| | A* | B* | A* | B* | A* | B* | A* | B* | A* | B* | A* | B* |
| Example 1 | 37 | 95 | 38 | 93 | 37 | 95 | 37 | 95 | 37 | 95 | 42 | 91 |
| Example 2 | 31 | 93 | 32 | 91 | 31 | 93 | 31 | 90 | — | — | — | — |
| Example 3 | 45 | 93 | 46 | 92 | 45 | 93 | 46 | 92 | — | — | — | — |
| Comparative Example 5 | 37 | 95 | above 70 | below 30 | 37 | 95 | above 70 | below 30 | 37 | 95 | above 70 | below 30 |
| Comparative Example 6 | 33 | 95 | above 70 | below 30 | 33 | 95 | 60 | 38 | — | — | — | — |
| Comparative Example 7 | 45 | 93 | above 70 | below 30 | 45 | 93 | 50 | 68 | — | — | — | — |

Note
A*: Transmission of Single Polarizer
B*: Polarizing Co-Efficient

TABLE 3

| | | Example 4 | | | | Comparative Example 8 | |
|---|---|---|---|---|---|---|---|
| | | Thermal Durability Test | | Humid Durability Test | | Humid Durability Test | |
| | | A* (%) | B* (%) | A* (%) | B* (%) | A* (%) | B* (%) |
| Initial Reference | | 51 | 92 | 48 | 95 | 49 | 95 |
| Moisture Content | 11% sample | 62 | 47 | 61 | 79 | above 70 | below 30 |
| | 8% sample | 55 | 84 | 56 | 85 | above 70 | below 30 |
| | 5% sample | 54 | 85 | 50 | 93 | above 70 | below 30 |
| | 1% sample | 52 | 90 | 49 | 95 | above 70 | below 30 |

Note
A*: Transmission of Single Polarizer
B*: Polarizing Co-Efficient

EXAMPLE 5

An iodine-treated PVA polarizing film was prepared under the same condition as in Reference Example 1 and this polarizing film was dried in the constant temperature box to have the decreased moisture content of 1%.

A HDPE film of 100 microns which had been stretched 7 times under the same condition as in Reference Example 1 was corona treated on one side surface thereof and was laminated on both surfaces of the polarizing film by use of urethane adhesive, where stretch-orientations of the polarizing film and HDPE film were set in the same direction. The polarizing plate thus obtained was stored under 70° C.-90% RH in the same box hereinbefore for 240 hrs, thereby the humid durability was tested. Another two groups of polarizing plates were applied; one was tested on the thermal durability in the same box at 100° C. for 13 hrs and another was tested on the weather durability in the sunshine weather meter for 200 hrs. Results are shown in Table 4.

of the polarizing plates was tested on the thermal durability by storing at 100° C. for 13 hrs in the same box and one more group thereof was tested on the weather durability for 200 hrs in the sunshine weather meter for 200 hrs. Results are shown in Table 4.

TABLE 4

|  | Thermal Durability Test | | | | Humid Durability Test | | | | Weather Durability Test | | | |
| --- | --- | --- | --- | --- | --- | --- | --- | --- | --- | --- | --- | --- |
|  | Initial Performance (%) | | Post-test Performance (%) | | Initial Performance (%) | | Post-test Performance (%) | | Initial Performance (%) | | Post-test Performance (%) | |
|  | A* | B* | A* | B* | A* | B* | A* | B* | A* | B* | A* | B* |
| Example 5 | 38 | 96 | 40 | 94 | 38 | 96 | 38 | 96 | 38 | 96 | 41 | 93 |
| Example 6 | 39 | 96 | 41 | 95 | 39 | 96 | 39 | 96 | 39 | 96 | 42 | 93 |

Note
A*: Transmission of Single Polarizer
B*: Polarizing Co-Efficient

EXAMPLE 6

An iodine-treated PVA polarizing film was prepared under the same condition as in Reference Example 1 and this film was dried in the same box to have the moisture content of 1%. On the other hand, polypropylene film of 100 microns, by Sumitomo Chemical Co., Ltd. with brandname Sumitomo Noblen ® FS2011, which had been stretched 6 times at 90° C. longitudinally and uniaxially by rolls with water as lubricant, was corona treated, and thereafter was laminated on both surfaces of the polarizing film by use of urethane adhesive, where stretch-orientations of the polarizing film and polypropylene film were set in the same direction. This rolled polypropylene film had the water vapor transmission of 2.4 g/m$^2$.day.100 microns and the average light transmission in the visible region of 88%. The polarizing plate thus obtained was stored under 70° C.-90% RH in the same conditioner for 240 hrs, thereby the humid durability was tested. Another group

We claim:
1. A process for producing a light-polarizing plate comprising a hydrophilic light-producing film covered with high polymer film protector comprising reducing the moisture content of said hydrophilic light-polarizing film to 5% or less then covering the hydrophilic film with a hydrophobic high polymer film protector having a water vapor transmission of not more than 10 g/m$^2$ day and an average light transmission in the visible region of not less than 30%.
2. A process according to claim 1 wherein the hydrophobic high polymer film protector is uniaxially stretched.
3. A process according to claim 1 comprising laminating the hydrophobic high polymer film protector on the hydrophilic light polarizing film.
4. A process according to claim 1 comprises coating the hydrophobic high polymer film protector on the hydrophilic light polarizing film.
5. A process according to claim 1 wherein the average light transmission in the visible region of the hydrophobic high polymer is at least 80%.
6. A process according to claim 5 wherein the average light transmission in the visible region of the hydrophobic high polymer is 80 to 88%.

* * * * *